United States Patent [19]

Polacek et al.

[11] 3,990,140
[45] Nov. 9, 1976

[54] VERTICAL TOOL CHANGER TO ADAPTER HOLDING MECHANISM

[75] Inventors: Richard Polacek, Rancho Palos Verdes; Efrain D. Lopez, Pasadena, both of Calif.

[73] Assignee: Houdaille Industries, Inc., Buffalo, N.Y.

[22] Filed: Nov. 20, 1974

[21] Appl. No.: 525,557

[52] U.S. Cl. .................................. 29/568; 294/106
[51] Int. Cl.² ......................................... B23Q 3/157
[58] Field of Search .................... 29/568; 294/106

[56] References Cited
UNITED STATES PATENTS

| | | | |
|---|---|---|---|
| 3,277,568 | 10/1966 | Wetzel | 29/568 |
| 3,760,490 | 9/1973 | Burg | 29/568 |

*Primary Examiner*—Othell M. Simpson
*Assistant Examiner*—Z. R. Bilinsky
*Attorney, Agent, or Firm*—Hill, Gross, Simpson, Van Santen, Steadman, Chiara & Simpson

[57] ABSTRACT

An automatic tool changer mechanism for a machine tool in which the tool is supported in an adapter having a tapered spindle-engaging end and an opposite tool-engaging end, and provided with a generally annular-shaped flange, intermediate its ends, having a generally V-shaped groove in the circumferential face thereof, a plurality of adapters being disposed in a magazine from which they may be selectively withdrawn and transported by means of a suitable transport mechanism to the spindle of the tool machine for use thereat, in which the adapter is supported, both in the magazine and during transport by means of cooperable jaws associated respectively with the transfer mechanism and the magazine, with such jaws being adapted to engage and support the adapter at such flange. The respective jaws are so designed that an adapter may be simultaneously gripped by a pair of jaws carried by the magazine and by the jaws of the gripping mechanism with the latter jaws being so constructed that in open position such jaws are so disposed that they will not interfere with movement of the magazine in the disposition of a selected adapter in operative position for transport to the machine tool spindle.

18 Claims, 10 Drawing Figures

VERTICAL TOOL CHANGER TO ADAPTER HOLDING MECHANISM

BACKGROUND OF THE INVENTION

The invention is directed to a structure for holding a machine tool adapter and associated tool in a cooperable magazine, as well as a novel cooperable arrangement of magazine and transport mechanism for such a tool changer. It is common in tool changer mechanisms to employ a tool adapter with each tool, with such adapter, in effect, providing a uniform connection between the tool, irrespective of its particular construction or configuration, and the machine tool spindle. A plurality of such adapters and associated tools are normally retained in a suitable magazine from which they are selectively withdrawn and transported, by a suitable transport mechanism, to a position for operative connection with the operating spindle of the machine tool.

Tool adapters of the type involved normally comprise a shank member which is provided with a tapered spindle engaging end and an opposite tool-engaging end, the latter usually being cylindrical in configuration. A generally annular-shaped flange is disposed at the junction of the cylindrical and tapered portions of the adapted with such flange being provided with a generally V-shaped groove in the circumferential face thereof, having notches therein for the reception of drive means carried by the spindle.

In the past, adapters of this type have been supported, in the cooperable magazine, by the cylindrical portion thereof, necessitating that such cylindrical portion have an axial length sufficient to enable a firm grip thereon by the retaining means associated with the magazine, particularly where the associated tools are relatively heavy, etc. Likewise, the necessity of providing a relatively long cylindrical portion resulted in a generally weaker adapter than would be the case if the cylindrical portion were of a minimum length. With such a minimum length and thus a stronger adapter, the machining capability of the machine tool is increased, with corresponding lower costs, as well as a possible commonality between tool systems on different machine tools.

BRIEF SUMMARY OF THE INVENTION

The present invention is directed to a supporting structure for adapters, particularly such as those previously described, in which the adapter and associated tool is supported in the magazine by gripping means which is engageable with the adapter flange rather than the cylindrical portion of the adapter, whereby the length of such cylindrical portion is independent of the gripping arrangement. Thus, both the gripping means of the magazine and the gripping means of the transport mechanism associated therewith may utilize the flange structure of the adapter for engagement and support of the adapter and associated tool. The invention readily adapts itself to a construction in which the gripping means of the magazine is engageable with one portion of the adapter flange and the gripping means of the transport mechanism is engageable with another portion of the adapter flange, whereby both of such gripping means may simultaneously engage the adapter and by suitable sequence in operation of the opening and closing of the respective jaws the adapter and associated tool may be readily transferred to and from the respective gripping means.

BRIEF DESCRIPTION OF THE DRAWINGS

In the drawings wherein like reference characters indicate like or corresponding parts.

DETAILED DESCRIPTION OF THE INVENTION

General

Figure 1:
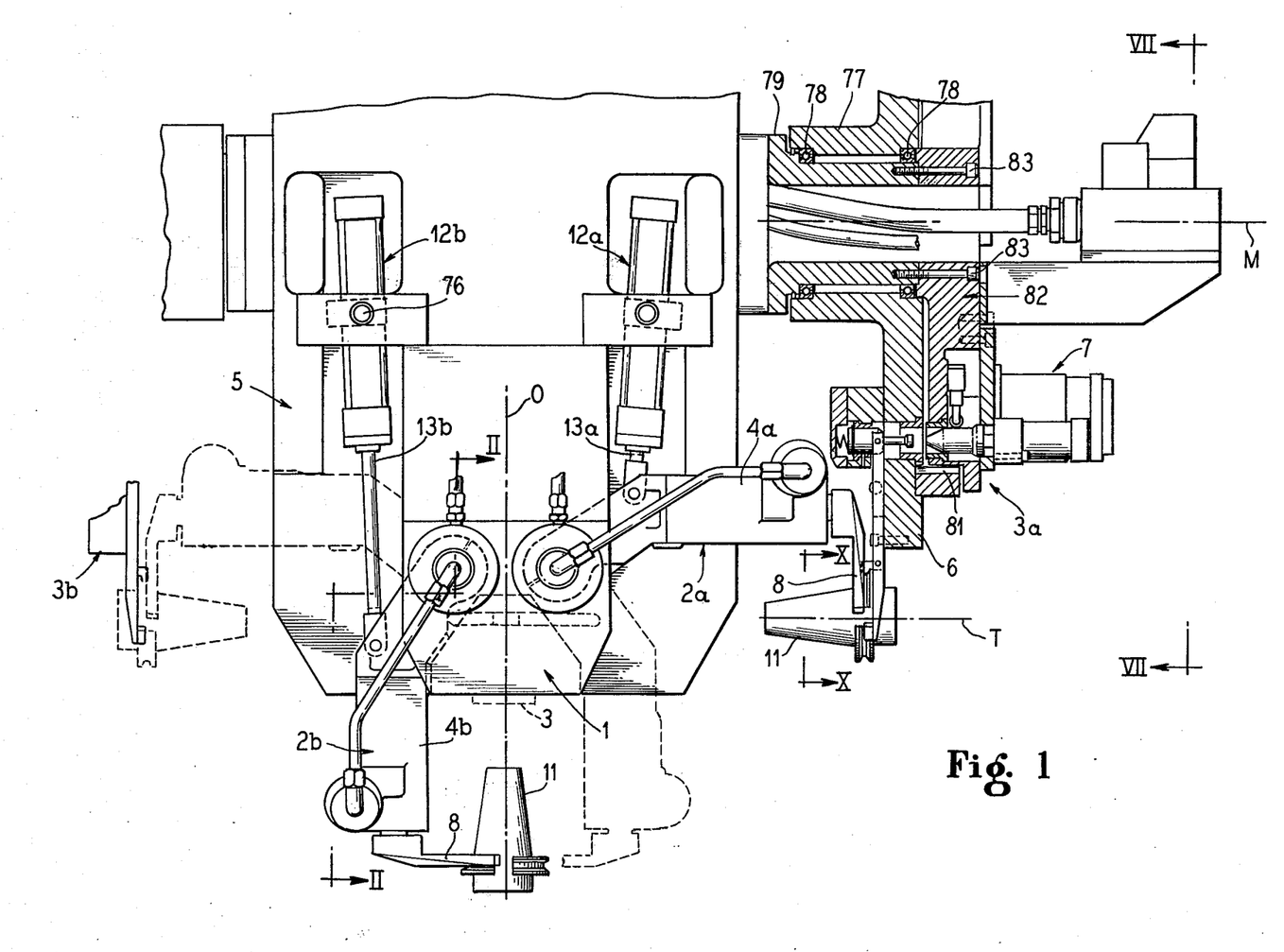
FIG. 1 is a front elevational view of a tool changing structure and a portion of a cooperable tool magazine structure (partially illustrated in section), which embody the invention.

Referring to the drawings and particularly to FIG. 1, the reference numeral 1 indicates generally a dual tool changer mechanism employing two transport mechanisms 2a, 2b which are cooperable with respective tool adapter magazines 3a and 3b. The two transport mechanisms 2a and 2b are of the same general construction with the exception that they are mere reversals of one another, whereby they may be symmetrically disposed on opposite sides of an operating axis O of a spindle 3' of a machine tool (not illustrated). It will be appreciated that, if desired, merely a single transport mechanism and a single magazine may be employed, depending, of course, on the nature of the machining operations involved and the number of different tools required.

The respective mechanisms 2a and 2b each include a swingable transport arm 4, each rotatably supported on an axis extending in parallel relation with respect to the axis of the other arm, with the plane of such axes extending normal to the axis O of the machine tool, and each arm being movable from the positions illustrated in solid lines to the positions illustrated in dotted lines, the arm 2a being illustrated in FIG. 1 in its uppermost position and the arm 2b being illustrated in its lowermost position. The arms 4 are suitably supported for the desired pivotal movement in a base member, indicated generally by the numeral 5, which is adapted to be suitably mounted on the machine tool to properly dispose the arms 4 in operative relation with respect to the operation axis O of the spindle of the machine tool.

Figure 7:
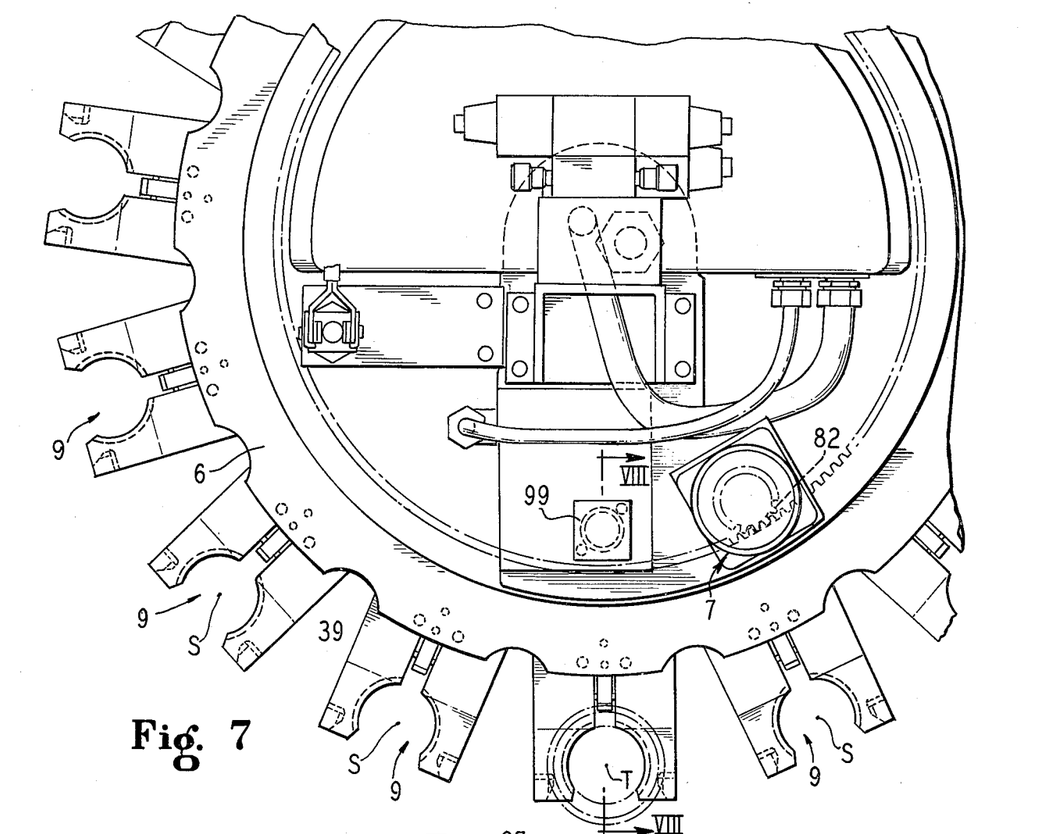
FIG. 7 is a side elevational view of a portion of the magazine structure partially illustrated in FIG. 1.

The magazines 3a and 3b likewise are adapted to be suitably supported, for example by mounting on the machine tool, with each magazine being generally circular in configuration as illustrated in FIG. 7. The magazine thus may comprise a rotary, generally disk-shaped member 6 pivotally supported for rotary movement about an axis M, with the member 6 being suitably power rotated, as for example by means of a suitable motor 7.

Each of the arms 4a and 4b is provided at its free end with adapter gripping means comprising a pair of adapter-gripping jaws 8 while the magazines are each provided with a plurality of gripping means, each comprising a pair of adapter-gripping jaws 9.

As hereinafter described in detail the respective pairs of adapter-gripping jaws are each adapted to engage and support a tool adapter illustrated in FIG. 1 and in greater detail in FIGS. 8 and 10. Each pair of jaws of the magazine are adapted to retain and support an adapter 11 and associated tool (not illustrated) on a respective storage axis S with each pair of gripping jaws 9 being adapted to be operatively disposed on a transfer axis T which, in the present embodiment of the invention, extends parallel to the pivot plane of the arms 4 and thus at right angles to the operating axis O. Likewise, in the embodiment illustrated the axis T lies in a common plane with the operating axis O.

Thus, by rotation of the member 6 of a magazine any one of the gripping means may be disposed to position an adapter carried thereby on the transfer axis T, in which position it may be subsequently engaged by the gripping jaws 8 of the cooperable arm 4 and upon closure of the associated gripping jaws 9, the adapter may be picked up by the transport mechanism and, through pivotal movement of the arm 4, the adapter carried thereby may be disposed in axial alignment on the operating axis O of the machine tool, from which it may be suitably connected with the operating spindle of the latter.

In the embodiment of the invention illustrated, pivotal movement of the respective arms 4 is accomplished by means of respective fluid cylinders 12a and 12b, each of which has a corresponding piston rod 13a or 13b, which is pivotally connected at its free end to the associated arm 4. Thus when the associated piston rod 13 is retracted, for example, the rod 13a, the associated arm 4a will be brought into its upper or raised position. In a similar manner when the rod is extended, as illustrated for the rod 13b, the associated arm 4b will be in its lower or bottom position.

The magazines 3 are so oriented relative to their respective arms 4 that when such arms is in its lowermost position the gripping means associated therewith will be operatively oriented on the operating axis O for engagement with and transport of a corresponding adapter, and when the arm is in its upper position the gripping means 8 thereof will be oriented to position an adapter carried thereby on the transport axis T. As subsequently described in detail the gripping jaws 8 associated with the respective arms are so designed that when the gripping jaws are in an adapter-releasing position, such jaws will be disposed out of the path of other adapters carried by the magazine, whereby the open jaws 8 will not interfere with selective movement of the magazine and disposition of any selected adapter on the transport axis T.

It will be particularly noted that, as the operating and transport axes are disposed in a common plane which is normal to the axes of the respective arms 4, the orientation of an adapter supported in the gripping means 8 may be retained in fixed relation with respect to the associated arm during movement thereof between positions on the transport and operating axes.

As subsequently described in detail, the construction illustrated in the drawings is designed for adapters 11 such as those illustrated in FIGS. 8 and 10, each of which comprises a shank member having a tapered end portion 14 and an opposite cylindrical end portion 15, with a generally annular shaped flange 16 being disposed at the junction of the tapered and cylindrical portions. The flange 16 is provided in its circumferential face with a generally V-shaped groove 17 and, as illustrated, the flange is interrupted by a pair of diametrically disposed notches 18 for engagement with cooperable means on the spindle of the machine tool for the transfer of torque from the spindle to the adapter and tool carried thereby.

Each adapter is suitably constructed for engagement with cooperable retaining means on the tool machine spindle whereby the adapter is effectively rigidly connected therewith, (the details of which form no part of the invention and are not illustrated). It will be particularly noted from a reference to FIG. 1 that the construction is such that an adapter 11, disposed on the transfer axis T, may be operatively gripped at the flange 16 by the respective gripping jaws 8 of the associated transport arm and the jaws 9 of the magazine.

THE ADAPTER TRANSPORT MECHANISM

As previously mentioned, FIG. 1 illustrates a dual installation of two magazines and two transport mechanisms disposed in opposed relation, each cooperatively related to the operating axis O of the machine tool spindle, whereby adapters and associated tools may be supplied from either magazine to such spindle. It will be appreciated that the magazines may be of identical construction with possibly merely a reversal of the mounting structure by means of which the magazine is attached to the machine tool, or, for example, may merely require mounting members of "left" and "right" handed configurations.

However, as the transport arms 4a and 4b are oppositely disposed with respect to the operating axis O the construction thereof as well as the actuating means therefor, while of generally identical mechanical and functional construction, may merely be minor reversals of one another, and the description of the physical construction of one will present all the necessary constructional details with respect to the other. FIGS. 2–6 thus are directed to the construction of the arm 4b and disclose the respective components correspondingly oriented.

Figures 2, 9, 10:
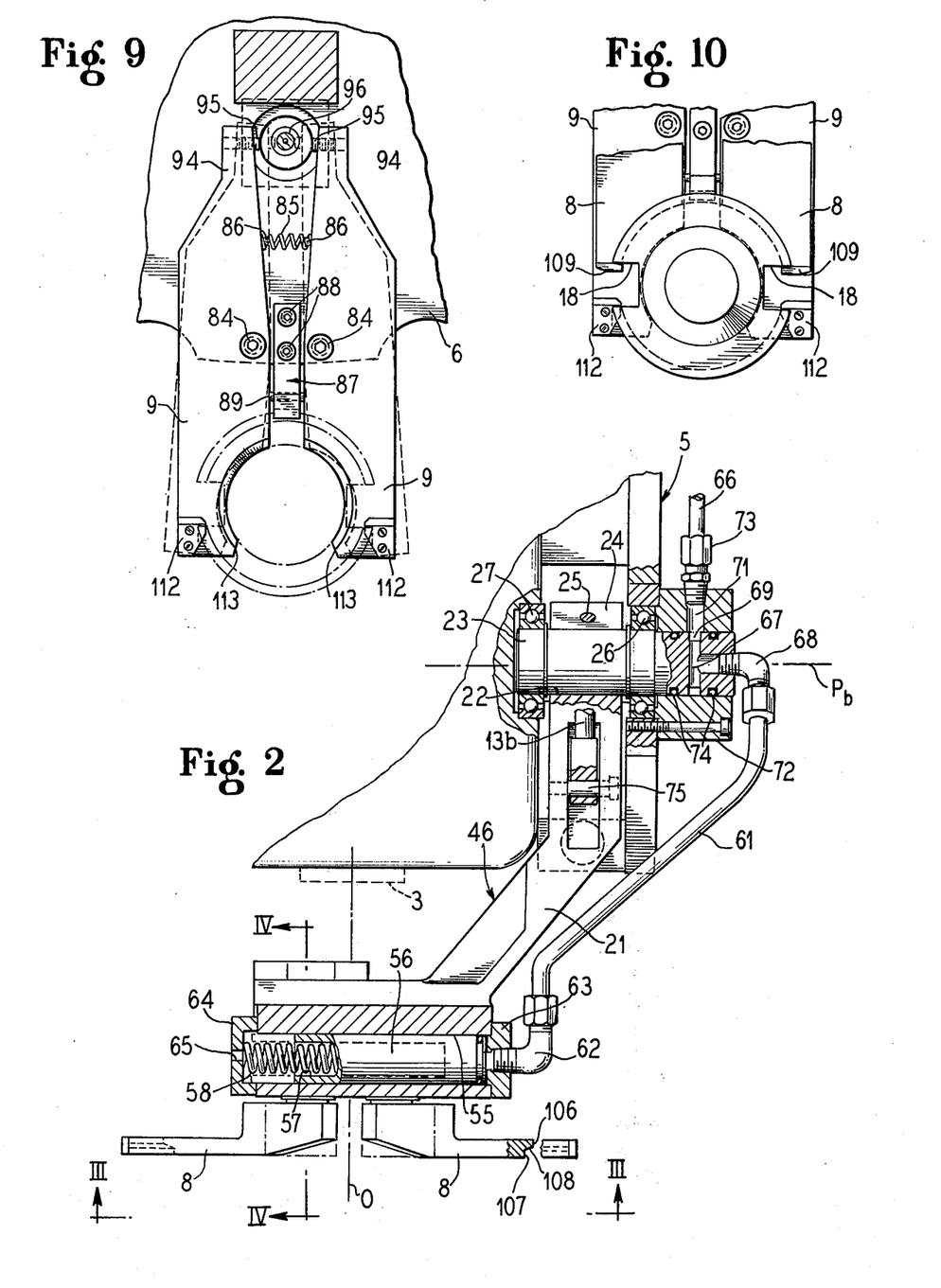
FIG. 2 is a sectional view through the tool changer structure, taken approximately on the line II—II of FIG. 1.
FIG. 9 is a sectional view taken approximately on the line IX—IX of FIG. 8.
FIG. 10 is an enlarged detail view of the jaw structures illustrated in FIGS. 3 and 9 with an adapter jointly supported therein.

Referring to FIG. 2 the arm 4b comprises a base member 21 which may be of unitary construction, i.e. a casting or the like, provided with a bore 22 therein in which is disposed a stub shaft 23. As illustrated, the member 21 may be provided with a slot 24 therein intersecting the bore 22 whereby the shaft 23 may be clamped to the member 21 by suitable means such as a bolt 25. The shaft 23 is suitably journaled in the base member 5 by a suitable ball bearing assembly 26 with the opposite end of the shaft being supported in a ball bearing assembly 27, suitably supported by the adjacent structure which may or may not be a part of the base member 5. The opposite end of the arm is provided with a chamber 28 therein, in which is disposed a pair of shafts 29 and 31, the shaft 29 being journaled in a suitable bushing-type bearing 32 carried by the member 21, with the opposite end of the shaft 29 being journaled in a similar bushing 33 carried by a cap member 34, suitably secured to the member 21, as for example threaded therein. In like manner the shaft 31 is journaled in a bushing 38 mounted in the member 21, while the opposite end of the shaft is journaled in a bushing 36 carried by a cap member 37 likewise suitably secured to the member 21 by cooperable threads or other suitable means.

Keyed to the shaft 29 are a pair of pinion gears 38 and 39, the two gears being illustrated as being secured in rigid relation on the shaft by a common key member 41. Adjustably mounted to the shaft 28 is a pinion gear 42 which is operatively meshed with the gear 39. In the embodiment illustrated, the adjustment between the shaft 31 and gear 42 is effected a pin 43 of elongated cross section extending diametrically with respect to the shaft 31 and movable along the axis of the shaft in a diametrically axially extending slot 44. The position of the pin 43 is determined by a pair of set screws 45 and 46 threaded into an axially extending bore 47 in the shaft 31. As illustrated, the pin 43 is engaged by the adjacent ends of the set screws 45 and 46 whereby the axial position of the pin 43 may be determined by relative adjustment of the two set screws. The free cylindrical end portions 48 of the pin 43 are disposed in respective diametrically positioned, oppositely inclined slots 49 in the adjacent wall of the pinion 42. Thus by axial displacement of the pin 43 along the shaft 31 a rotational adjustment of the pinion 42 relative to the shaft 31 may be effected.

Figures 4, 5, 6:
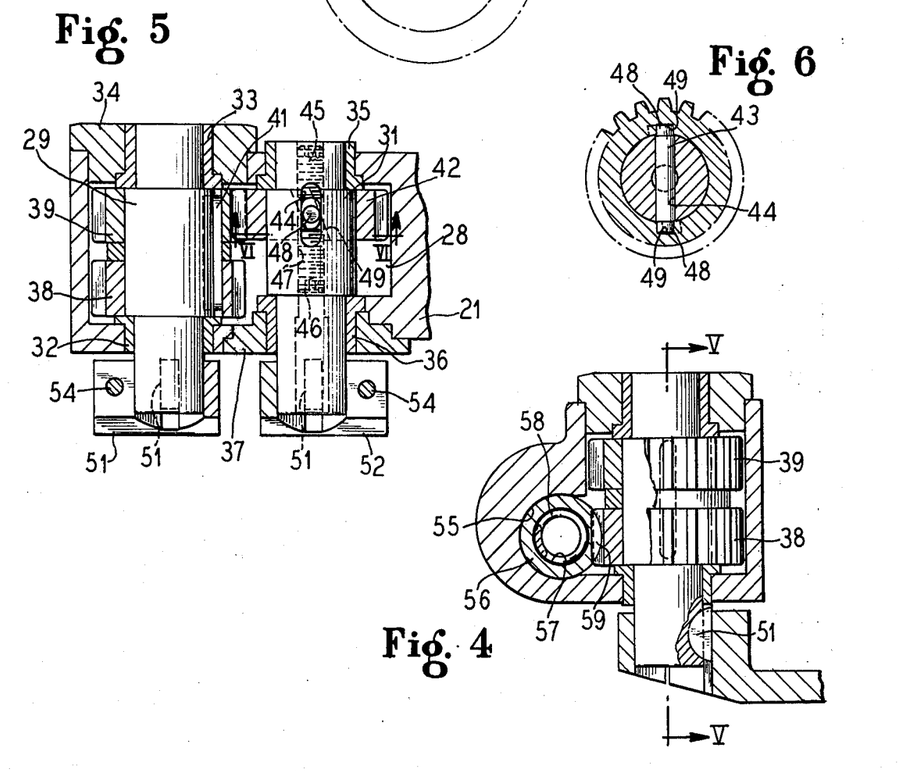
FIG. 4 is a sectional view taken approximately on the line IV—IV of FIG. 2.
FIG. 5 is a sectional view taken approximately on the line V—V of FIG. 4.
FIG. 6 is a sectional view taken approximately on the line VI—VI of FIG. 5.

The lower ends of the shafts 29 and 31, as viewed in FIGS. 2, 4 and 5 extend from the arm 21 and carry respective adapter gripping jaws 8, of substantially like construction but are mere reversals of one another to form right and left handed jaw members. The jaw members 8 may be rigidly secured to the respective shafts by respective keys 41, and rigidly secured to the shafts by respective clamping screws 52 connecting portions 53 of the associated jaw member, formed by the respective slots 54.

As hereinafter described in detail, the jaws 8 are cooperable to releasably grip a tool adapter for supporting the same during transport thereof.

In the embodiment illustrated the jaws are retained in one of their positions by suitable spring means and actuated to their other position by pneumatical or hydraulic means.

Referring to FIGS. 2 and 4 it will be noted that the lower end of the member 21 is provided with a piston bore 55 therein, in which is disposed a piston 56, the latter being provided with a bore 57 therein in which is seated a compression spring 58 adapted to bias the piston 56 to the right-hand end of the bore 55, as illustrated in FIG. 2. As illustrated in FIG. 4 the piston 56 is provided with rack teeth 59 thereon disposed to mesh with the pinion 38, whereby reciprocation of the piston 56 is operable to rotate pinions 38 and 39, with such rotary motion being transmitted to the pinion 42 through the pinion 39 whereby both shafts rotate in unison but in opposite directions.

The piston 56 is adapted to be actuated to its left-hand end position as viewed in FIG. 2 by means of fluid pressure supplied to the right-hand end of the cylinder through a conduit 61 terminating in an ell-fitting 62 threaded into the end cap member 63 closing the right-hand end of the bore 55. The left-hand end of the bore 55 is closed by a similar cap member 64 having a vent port 65 therein for ingress and egress of air during movement of the piston 56.

The fluid line 61 is operatively connected to a supply line 66 by means of a transversely extending bore 67 in the shaft 23, which operatively communicates with the conduit 61 by means of an ell-fitting 68. The shaft 23 is provided with an annular groove 69, on which the ends of the bore 67 open, which groove in turn communicates with a bore 71 in an end member 72 mounted on the member 5, with the conduit 66 being operatively connected by a suitable fitting 73 to the bore 71. Fluid leakage around the shaft 23 is prevented by suitable means, such as a pair of O-rings 74 disposed at opposite sides of the bore 71.

As previously mentioned the lower ends of the piston rods 13a, 13b are suitably pivotally connected to the respective members 21, for example by means of respective shouldered bolts 75, with the hydraulic cylinders 12a, 12b being pivotally supported from the member 5 by suitable means, for example trunnion means 76, whereby the cylinder can pivot in response to orbital movement of the lower end of the piston rod 13b.

THE MAGAZINE

As previously mentioned, the magazines 3a and 3b may be of identical construction and merely oppositely dispoed with respect to the spindle 3' of the machine tool. Referring to FIGS. 1, 7 and 8, the member 6, which is of circular configuration, is provided with a central hub portion 77 which is mounted through bearing assemblies 78 on a hollow shaft member 79, suitably mounted on the machine tool, whereby the member 6 may be rotated about the axis M.

As previously mentioned, the member 6 is provided with a plurality of radially extending pairs of gripping jaws 9, which are disposed in circumferential spaced relation around the member 6.

In the embodiment illustrated, rotation of the member 6 by means of the motor 7 is accomplished by an internal gear 81 suitably carried by the member 6, with the teeth of such gear meshed with a drive pinion 82 mounted on the drive shaft of the motor 7. The latter is rigidly mounted on a stationary member or plate 82, rigidly secured to the hollow shaft 79 by suitable means such as the plurality of bolts 83.

The rotary member 6 may be suitably indexed to insure that each pair of jaws, as selected, are moved to a position in which the storage axis S of a pair of jaws is aligned on the transport axis T. Numerous types of indexing mechanisms are available for such purposes and the details thereof form no part of the present invention. As illustrated in FIGS. 7-9, each jaw member 9 is pivotally supported on the member 6 by suitable means, for example shouldered bolts 84, with the jaws normally urged in a closing direction by a compression spring 85 extending between the upper portions of the jaws, as viewed in FIG. 9, with the spring being maintained in operative position on respective retaining pins 86.

Also carried by the member 6 are a plurality of adapter-engaging blocks indicated generally by the numeral 87, each disposed between a pair of jaws 9 and secured to the member 6 by suitable means such as respective bolts 88. Each block 87 carries a transversely extending pin 89 which forms limiting stops for the closing movement of the jaws, such pin being proportioned to provide the desired disposition of the jaws when in closed positions. As hereinafter described in detail, with respect to the respective jaw structures of both the magazine and the transport arm, the magazine jaws 9 are adapted to be sprung into open position to release or receive an adapter during insertion or withdrawal of an adapter therefrom, in opposition to the spring 85.

In the embodiment of the invention illustrated, means is also provided to insure that the jaws 9 will remain in closed position when supporting an adapter in storage position to prevent the possibility of inadvertent disengagement of the jaws from a stored adapter and mounted tool. In the construction illustrated, such means comprises a plunger 91 mounted for reciprocation in a bushing 92, suitably mounted on the member 6. The plunger 91, as will be apparent from a reference to FIG. 9, is normally urged in a right-hand direction as viewed in FIG. 3 by a compression spring 93, in which position the relatively large portion of the plunger would be disposed between the upper portions 94 of the respective jaws 9 to restrict opening movement of the jaw members.

Accurate adjustment of the relationship between the parts can be effected by respective set screws 95 each threadedly mounted in the adjacent end 94 of a jaw member and adapted to engage the plunger 91 when in its jaw-locking position. To insure smooth operation of the plunger, it may be beveled or chamfered on its leading edges engageable with the set screws 95. FIG. 1 illustrates the plunger in jaw locking position while FIG. 8 illustrates the plunger in jaw releasing position. As illustrated in the latter figure, the plunger terminates at its free end in an extension 96 of a considerably smaller diameter than that of the plunger body proper with such smaller diameter being such that it will not interfere with the normal opening movement of the jaws when the plunger is in the position illustrated in FIG. 8.

Actuation of the plunger to jaw-releasing position is accomplished by an actuating member or plunger 97 rigidly mounted on the adjacent free-end 98 of a hydraulic or pneumatic cylinder 99 carried by a portion of the stationary member 82. The cylinder 99 may be provided with fluid ports 101 and 102 for actuation of the piston associated therewith and thereby actuation of the actuating member 97 to extended and retracted positions, with such actuating member being operative in its actuated position to move the plunger 91 to jaw releasing position as illustrated in FIG. 8.

In connection with the actuation of the cylinder 99, a sensing switch 103 may be provided having an actuating roller engaged with the actuating member 97 and adapted to be moved into desired positions by suitable configuration of the outer surface of the member 97. In the embodiment illustrated, the member 97 is provided with an enlarged portion adjacent its connection to the rod 98 whereby the roller will ride up on such enlarged portion when the jaws are in released position but will ride on a portion of the member of a smaller diameter when the jaws are locked, as illustrated in FIG. 1. As illustrated in FIG. 8, the plunger is reciprocably mounted in the busing 104, carried by the member 82, with the member 6 being provided with an aligned bushing 105 which may further guide the actuating member 97 as well as providing guiding means for the tapered free end of the actuating member whereby accurate alignment of the member 6 with respect to the transfer axis T is assured in the event that the indexing mechanism failed to exactly align the member 6 in the desired position.

ADAPTER-GRIPPING STRUCTURE

The adapter-gripping structure on the respective jaws 8 of the transport mechanism and the jaw 9 of the magazine structure both are constructed to engage the adapter flange 16 of the adapter 11.

Figure 3:
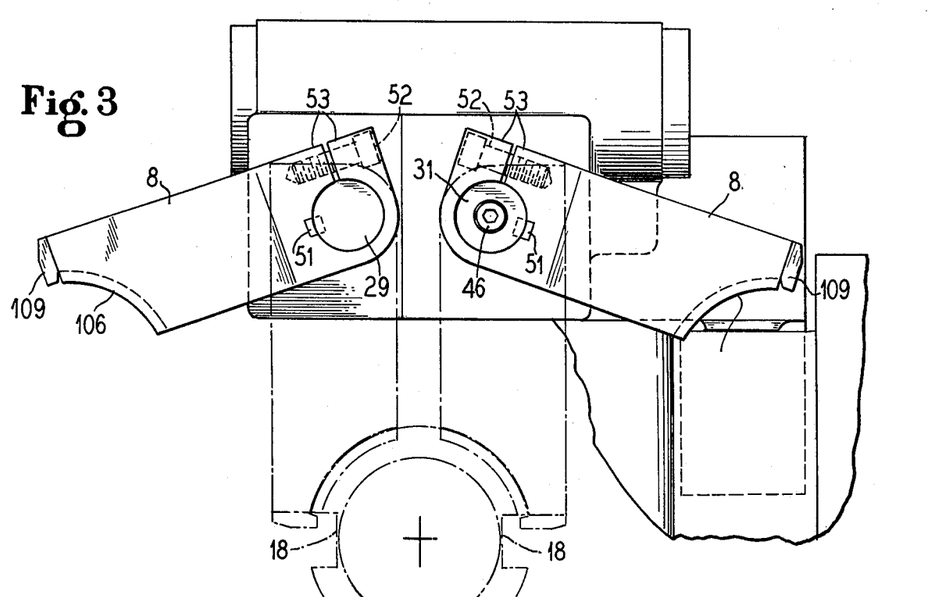
FIG. 3 is a bottom plan view of the jaw structure of the tool changing mechanism as illustrated in FIG. 2.

Considering first the jaws 8, it will be noted from a reference to FIG. 3 that each jaw is provided with an arcuate shaped portion 106, having a cross-sectional configuration as illustrated in section in FIG. 2, and an arcuate portion 107 of greater radius, connected by an angularly extending conical face 108, with the faces 106, 107 and 108 preferably being complemental to the corresponding surfaces of the flange 16 and groove 17.

The extreme outer end of each jaw is provided with a lug 109 having a configuration such that it may enter a notch 18 of the adapter 11. Thus, when the jaws are closed upon an adapter, as illustrated in FIG. 1, the latter may be firmly gripped and supported by the jaws, with the adapter effectively clamped therebetween and the lugs 109 effectively rigidly retaining the adapter in the jaws.

Figure 8:
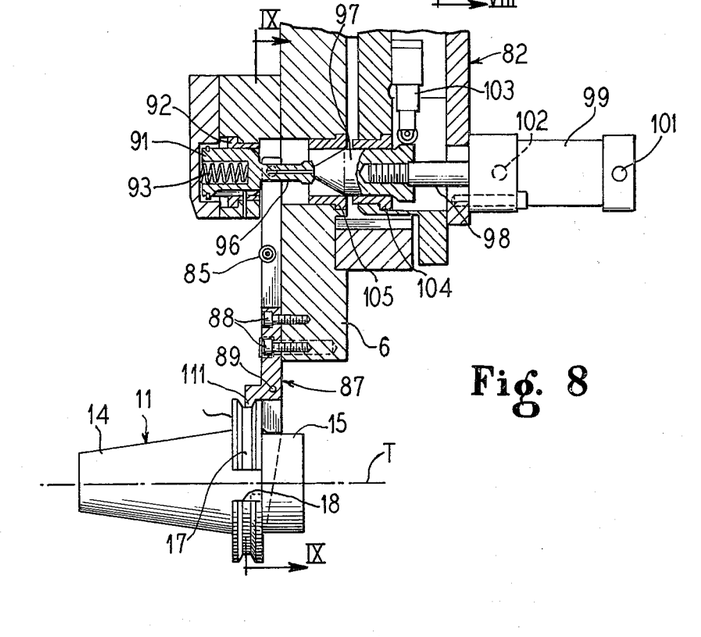
FIG. 8 is a sectional view taken approximately on the line VIII—VIII of FIG. 7.

Referring to FIGS. 8 and 9, it will be noted that the block 87 is provided at its lower end, as viewed in FIG. 8, with an end portion 111 having respective surfaces complemental to the adjacent outer periphery of the flange 16 of an adapter, the adjacent angularly extending wall of the groove 17 and the bottom of the latter. In like manner the jaws 9 are each provided with a radially inwardly directed lug 112 of a configuration corresponding to the adapter engaging portion 111 of the block 87 and likewise adapted to engage the flange 16 of an adapter.

Thus, an adapter may be firmly supported in the jaws 9 whih operatively engage the adapter at the groove 17 at three points, namely the block 87 and lugs 112 with the adjacent end face of the flange 16 bearing on adjoining portions of the jaws as will be clearly apparent from a reference to FIG. 8.

FIG. 10 illustrates an adapter simultaneously engaged by a pair of jaws 9 of the magazine and the jaws 8 of a cooperable transport mechanism. It will be noted that while the adapter is so supported by the jaws 9, it is simultaneously engaged by the jaws 8 with the projections 109 entering the notches 18 of the adapter. It will also be noted that the block 89 may extend into the space between the jaws 8, the latter having sufficient spacing, when in closed position, to accommodate such block. Consequently, the adapter may be simultaneously firmly gripped by both pair of jaws without interference from one another.

OPERATION

In considering the operation of the transport mechanism herein described, it will be assumed that the various components of the structure are in the positions illustrated in FIG. 1 in which the transport arm 4a is in its uppermost position with the jaws thereof operatively aligned on the transport axis T, in engagement with an adapter 11, which is also gripped by the adjacent cooperable jaws 9 of the magazine disposed on such transfer axis. The other arm 4b is disposed in its lowermost position and has positioned an adapter on the operating axis O of the machine tool spindle 3.

The specific means for retaining an adapter in the machine tool spindle may be of any suitable construction and the details thereof do not form a part of the present invention, in view of which they have not been illustrated. Simultaneously, an empty pair of jaws 9 of the magazine 3b are disposed on the corresponding transport axis thereof, which are adapted to receive the adapter presently carried by the arm 4b.

Assuming that a new adapter and tool are to be inserted from the magazine 3a into the spindle 3, the arm 4b will be rotated into the position illustrated in dotted lines and in connection with such movement the associated actuating plunger 87 will be actuated to release the jaws 9 disposed thereat whereby such jaws are free to be moved into open, adapter receiving position by camming action of the cylindrical portion 15 on the angularly extending edges 113 of the jaws 9, in opposition to the spring 85, whereby the jaws will spring to closed position as soon as the adapter is positioned on the transfer axis T. Upon release of the plunger 97 the jaws 9 will be firmly locked in closed positions to insure retention of the adapter therein.

The adapter 97 associated with the magazine 3a will then be actuated to release the jaws 9 and the arm 4a will be rotated by actuation of the cylinder 12a to its lowermost position, initial movement of such arm forcing the adapter out of the cooperable jaws 9 and permitting the adapter carried thereby to be disposed on the operating axis O. Fluid under pressure may then be introduced in the cylinder 55 to actuate the piston 56 with movement of the latter being operative to rotate the associated pinions and pivot the jaws 8 into their open positions illustrated in FIG. 7. The arm 4b then may be returned to its original position where it will be out of the way with respect to the operations being performed by the machine tool.

It will be particularly noted, from a reference to FIG. 7, that the jaws 8 are adapted to be opened to a relatively large angle of over 120° whereby the jaws, when opened while the associated arm 4a or 4b is in its uppermost position, will be well above the path of adapters carried by the magazine as well as out of the path of the gripping jaws associated therewith. Consequently, each arm 4a and 4b may be disposed in its uppermost position and the jaws 8 thereof rotated to open positions, permitting free rotating of the magazine and adapters carried thereby, without any interference from the transport mechanism. Consequently, any adapter may be selected, and the member 6 rotated to position the selected adapter on the corresponding transport axis T, following which it may be transported to the operating axis O in the manner heretofore described.

It will be particularly noted that the construction is such that neither the tapered portion of the adapted nor the cylindrical portion are required in retention of the adapter in either the transport mechanism or the storage magazine. Consequently, the corresponding proportions of the adapter are not dependent upon the gripping means of either the magazine or the transport mechanism, and the cylindrical portion 15 of the adapter may be reduced to a bare minimum, consistent with that employed to open the jaws 9 as previously described. As the cylindrical diameter is no longer required for holding the adapter in the magazine, the axisl length of such diameter can be short, resulting in a stronger adapter, with a corresponding increase in the machining capability of the machine tool and consequent lower cost and commonality between tool systems of different machine tools.

It will be appreciated that, where the adapters and tools carried thereby are of sufficiently light weight, that springs of adequate force may be employed to suitably maintain the jaws in closed position about an adapter, the jaw locking means illustrated may be omitted.

Likewise, the arrangement of the piston 56 and spring 58, as well as the shafts 29 and 31 may be reversed whereby the jaws 8 are retained in closed position by the spring 58 and actuated to open position by movement of the piston.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In an automatic tool changer for a machine tool, in which the tool is supported in an adapter having a tapered spindle-engaging end and opposite tool-engaging end, and provided with a generally annularly-shaped flange, intermediate its ends, which has a generally V-shaped groove in the circumferential face thereof, said flange having a pair of diametrically disposed notches therein for cooperation with such a machine tool spindle, the combination of a magazine having a pair of adapter-gripping jaws disposed primarily at one side of a plane containing the axis of an adapter supported in such jaws, the latter being constructed to at least partially encircle such as adapter at said flange with said jaws primarily disposed at one side of the second plane normal to said axis and substantially bisecting such V-groove, and a tool-transport mechanism for withdrawing such an adapter from or inserting it in said magazine, said transport mechanism having a pair of releasable adapter gripping jaws and being movable to position the jaws thereof at least primarily at the same side of said first plane as said magazine jaws, said jaws of the transport mechanism likewise being constructed to partially encircle such an adapter at said flange, primarily at the opposite side of said second plane, with said pairs of gripping jaws being so disposed that they may simultaneously grip such as adapter flange.

2. A tool changer according to claim 1, wherein said magazine is provided with a plurality of pairs of adapter-gripping jaws, whereby a plurality of adapters may be retained therein, said magazine being selectively movable to permit any of the adapters therein to be disposed for engagement with the adapter-gripping jaws of said transport mechanism, the latter jaws being constructed to open to positions out of the path of adapters in said magazine during movement of the latter when said transport mechanism is in a position for receiving an adapter from such magazine.

3. In an automatic tool changer for a machine tool having an operating axis on which a tool is operable, with the tool being supported in a tool adapter having a tapered spindle-engaging end and an opposite tool-engaging end, and provided with a generally annularly-shaped flange intermediate its ends which has a generally V-shaped groove in the circumferential face thereof, said flange having a pair of diametrically disposed notches therein for cooperation with such a machine tool spindle, the combination of a tool storage structure having a movable magazine which carries a plurality of releasable adapter-gripping means, each adapted to support an adapter, and tool associated therewith, on a respective storage axis, each of which may be positioned on a transfer axis by selective movement of said movable magazine, an adapter and tool transport mechanism, including adapter-gripping means, for transferring an adapter and tool in said magazine from a transfer position on said transfer axis to a position on said operating axis for operative connection to such a machine tool, each of said releasable adapter gripping means of the magazine comprising a pair of cooperable adapter-gripping jaws, said jaws being provided adjacent their free ends with adapter-engaging portions disposed to engage such an adapter at spaced points located at one side thereof defined in said diametrical notches, and a stationary member disposed to engage the adapter at the other side of adapter to provide a three-point support of the latter, said transport mechanism having a transfer arm adapted to be mounted on such a machine tool for movement relative to said transfer and operating axis, releasable adapter-gripping means carried by said arm adapted to support an adapter and associated tool, means for moving said arm from a first position adjacent said operating axis to a second position adjacent said transfer axis, operative to correspondingly orient said transfer arm adapter-gripping means and a tool carried thereby, on either said operating axis when said arm is in said first position, or on said transfer axis in said transfer position when said arm is in said second position, and means connected to said arm for selectively actuating the gripping means thereon to and from adapter-gripping and releasing positions when said gripping means is operatively disposed at either such an operating axis of at such transfer axis, said gripping means of both said magazine and transport arm being so constructed that they may simultaneously engage an adapter, in said transfer position, at said V-shaped groove and support the same thereat.

4. A tool changer according to claim 3, wherein said stationary member is provided with means engageable with said jaws to limit the closing movement thereof.

5. A tool changer according to claim 3, wherein said jaws are of elongated construction and mounted for pivotal movement about respective axes, respectively positioned intermediate the ends of the jaws, comprising in further combination, spring means operatively engaging said jaws, operative to bias the latter in their closed positions, and jaw-restricting means disposed adjacent the ends of said jaws at the opposite side of said axes, movable into one position in which opening movement of such jaws is prevented thereby, and into a second position in which movement of such jaws is unrestricted.

6. A tool changer according to claim 5, wherein each of said jaws has a portion engageable with said flange, with said flange-engageable portions disposed to engage an adapter at one side thereof defined by said diametrical notches, and means at the free ends of said jaws disposed to enter the respective notches and retain said side of such an adapter in engagement with the flange-engaging portions of the jaws.

7. A tool changer according to claim 6, wherein said stationary member is provided with means engageable with said jaws to limit the closing movement thereof.

8. In an automatic tool changer for a machine tool having an operating axis on which a tool is operable, with the tool being supported in a tool adapter, the combination of a tool storage structure having a movable magazine which carries a plurality of releasable adapter-gripping means, each adapted to support an adapter, and tool associated therewith, on a respective storage axis, each of which may be positioned on a transfer axis by selective movement of said movable magazine, said magazine being so disposed that said transfer axis and said operating axis are in a common plane, an adapter and tool transport mechanism, including adapter-gripping means, for transferring an adapter and tool in said magazine from a transfer position on said transfer axis to a position on said operating axis for operative connection to such a machine tool, said transport mechanism having a transfer arm adapted to be mounted on such a machine tool for pivotal movement about a fixed pivotal axis extending transversely to said plane and symmetrically disposed with respect to said transfer position and said position on said operating axis, releasable adapter-gripping means carried by said arm adapted to support an adapter and associated tool on an axis which is fixed with respect to said arm, and comprising a pair of adapter-gripping jaws, each of said jaws being carried by respective shafts, a gear disposed on each shaft and meshed with one another and connecting said shafts for simultaneous rotation thereof in opposite directions, and means adjustably connecting one shaft with the associated gear for effecting rotary adjustment therebetween, means for pivoting said arm about its pivotal axis from a first position adjacent said operating axis to a second position adjacent said transfer axis, operative to correspondingly orient said transfer arm adapter-gripping means and a tool carried thereby, on either said operating axis, when said arm is in said first position, or on said transfer axis in said transfer position when said arm is in said second position, and means connected to said arm for selectively actuating the gripping means thereon to and from adapter-gripping and releasing positions when said gripping means is operatively disposed at either such an operating axis or at such transfer axis, said transfer arm gripping means being movable to an adapter-releasing position out of the path of adapters and associated tools, disposed on respective storage axes of said magazine, during movement thereof to and from said transfer position.

9. A tool changer according to claim 8, wherein said gear-adjusting means comprises a key member axially adjustable along the associated shaft and having end portions disposed in inclined keyways in the cooperable gear, whereby axial adjustment of the key is operative to effect rotational adjustment of the gear relative to the shaft.

10. A tool changer according to claim 9, wherein said key is adjustable by rotation of a pair of set screws disposed in opposed relation on the axis of such shaft, between which said screws and said key extends.

11. A gripping structure for engagement with and support of a tool-supporting adapter having a tapered spindle-engaging end and an opposite tool-engaging end, and provided with a generally annularly-shaped flange, intermediate its ends, which have a generally V-shaped groove in the circumferential face thereof, said flange having a pair of diametrically disposed notches therein for cooperation with such a machine tool spindle, comprising a pair of jaws, movable to closed and open positions, said jaws being constructed to at least partially encircle such an adapter at said flange, and engage portions of such flange to relatively rigidly support such an adapter by said flange, said jaws being provided adjacent their free ends with adapter-engaging portions disposed to engage such an adapter at spaced points located at one side thereof defined in said diametrical notches, and a stationary member disposed to engage the adapter at the other side of adapter to provide a three-point support of the latter.

12. A gripping structure according to claim 11, comprising in further combination, spring means operatively connecting said jaws, operative to bias the latter in their closed positions, means selectively movable into a first position in which opening movement of said jaws is prevented thereby, and into a second position in which movement of such jaws is unrestricted thereby.

13. A gripping structure according to claim 11, wherein said stationary member is provided with means engageable with said jaws to limit the closing movement thereof.

14. A gripping structure according to claim 11, wherein said jaws are of elongated construction and mounted for pivotal movement about respective axes, respectively positioned intermediate the ends of the jaws, comprising in further combination, spring means operatively engaging said jaws, operative to bias the latter in their closed positions, and jaw-restricting means disposed adjacent the ends of said jaws at the opposite side of said axes, movable into one position in which opening movement of such jaws is prevented thereby, and into a second position in which movement of such jaws is unrestricted.

15. A gripping structure according to claim 14, wherein said stationary member is provided with means engageable with said jaws to limit the closing movement thereof.

16. In an automatic tool changer for a machine tool having an operating axis on which a tool is operable, with the tool being supported in a tool adapter having a tapered spindle-engaging end and an opposite tool-engaging end, and provided with a generally annularly-shaped flange intermediate its ends which has a generally V-shaped groove in the circumferential face thereof, said flange having a pair of diametrically disposed notches therein for cooperation with such a machine tool spindle, the combination of a tool storage structure having a movable magazine which carries a plurality of releasable adapter-gripping means, each adapted to support an adapter, and tool associated therewith, on a respective storage axis, each of which may be positioned on a transfer axis by selective movement of said movable magazine, and adapter and tool transport mechanism, including adapter-gripping means, for transferring an adapter and tool in said magazine from a transfer position on said transfer axis to a position on said operating axis for operative connection to such a machine tool, each of said releasable adapter gripping means comprising a pair of cooperable adapter-gripping jaws, said jaws each having a portion engageable with said flange, with said flange-engageable portions disposed to engage an adapter at one side thereof defined by said diametrical notches, and means at the free ends of said jaws disposed to enter the respective notches and retain said side of such an adapter in engagement with the flange-engaging portions of the jaws, said transport mechanism having a transfer arm adapted to be mounted on such a machine tool for movement relative to said transfer and operating axis, releasable adapter-gripping means carried by said arm adapted to support an adapter and associated tool, means or moving said arm from a first position adjacent said operating axis to a second position adjacent said transfer axis, operative to correspondingly orient said transfer arm adapter-gripping means and a tool carried thereby, on either said operating axis when said arm is in said first position, or on said transfer axis in said transfer position when said arm is in said second position, and means connected to said arm for selectively actuating the gripping means thereon to and from adapter-gripping and releasing positions when said gripping means is operatively disposed at either such an operating axis of at such transfer axis, said gripping means of both said magazine and transport arm being so constructed that they may simultaneously engage an adapter, in said transfer position, at said V-shaped groove and support the same thereat.

17. In an automatic tool changer for a machine tool having an operating axis on which a tool is operable, with the tool being supported in a tool adapter having a tapered spindle-engaging end and an opposite tool-engaging end, and provided with a generally annularly-shaped flange intermediate its ends which has a generally V-shaped groove in the circumferential face thereof, said flange having a pair of diametrically disposed notches therein for cooperation with such a machine tool spindle, the combination of a tool storage structure having a movable magazine which carries a plurality of releasable adapter-gripping means, each adapted to support an adapter, and tool associated therewith, on a respective storage axis, each of which may be positioned on a transfer axis by selective movement of said movable magazine, each of said releasable adapter gripping means comprising a pair of cooperable adapter-gripping jaws, spring means operatively connecting said jaws, operative to bias the latter in their closed positions, means selectively movable into a first position in which opening movement of said jaws is prevented thereby, and into a second position in which movement of such jaws is unrestricted thereby, an adapter and tool transport mechanism, including adapter-gripping means, for transferring an adapter and tool in said magazine from a transfer position on said transfer axis to a position on said operating axis for operative connection to such a machine tool, said transport mechanism having a transfer arm adapted to be mounted on such a machine tool for movement relative to said transfer and operating axis, releasable adapter-gripping means carried by said arm adapted to support an adapter and associated tool, means for moving said arm from a first position adjacent said operating axis to a second position adjacent said transfer axis, operative to correspondingly orient said transfer arm adapter-gripping means and a tool carried thereby, on either said operating axis when said arm is in said first position, or on said transfer axis in said transfer position when said arm is in said second position, and means connected to said arm for selectively actuating the gripping means thereon to and from adapter-gripping and releasing positions when said gripping means is operatively disposed at either such an operating axis of at such transfer axis, said gripping means of both said magazine and transport arm being so constructed that they may simultaneously engage an adapter, in said transfer position, at said V-shaped groove and support the same thereat.

18. A gripping structure for engagement with and support of a tool-supporting adapter having a tapered spindle-engaging end and an opposite tool-engaging end, and provided with a generally annularly-shaped flange, intermediate its ends, which has a generally V-shaped groove in the circumferential face thereof, said flange having a pair of diametrically disposed notches therein for cooperation with such a machine tool spindle, comprising a pair of jaws, movable to closed and open positions, said jaws being constructed to at least partially encircle such an adapter at said flange, and engage portions of such flange to relatively rigidly support such an adapter by said flange, each of said jaws having a portion engageable with said flange, with said flange-engageable portions disposed to engage an adapter at one side thereof defined by said diametrical notches, and means at the free ends of said jaws disposed to enter the respective notches and retain said side of such an adapter in engagement with the flange-engaging portions of the jaws.

* * * * *

UNITED STATES PATENT AND TRADEMARK OFFICE
CERTIFICATE OF CORRECTION

PATENT NO. : 3,990,140
DATED : November 9, 1976
INVENTOR(S) : Richard Polacek et al It is certified that error appears in the above-identified patent and that said Letters Patent are hereby corrected as shown below:

Column 1, line 26 "adapted should be --adapter--;

Column 5, line 2, "bushing 38" should be --bushing 35--.

Column 5, line 36, "keys 41" should be --keys 51--.

Column 8, line 36, "whih" should be --which--;

Column 9, line 10, "plunger 87" should be --plunger 97--;

Column 9, line 44, "rotating" should be --rotation--.

Column 9, line 53 "adapted" should be --adapter--;

Claim 16 (Rev. Cl 22), line 16 of claim, col. 13 shows "and adapter" and it should be --an adapter--

Claim 16 (Rev. Cl. 22), line 1, column 14, shows "means or moving" and it should be --means for moving--

Signed and Sealed this

Twenty-second Day of April 1980

[SEAL]

Attest:

SIDNEY A. DIAMOND

*Attesting Officer*  *Commissioner of Patents and Trademarks*